US009333606B2

(12) United States Patent
Jin (10) Patent No.: US 9,333,606 B2
(45) Date of Patent: May 10, 2016

(54) DEVICE FOR ALIGNING DOOR HINGE OF AUTOMATIC SYSTEM FOR MOUNTING DOOR HINGE TO VEHICLE

(71) Applicants: Hyundai Motor Company, Seoul (KR); Kia Motors Corporation, Seoul (KR)

(72) Inventor: Taeheun Jin, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 219 days.

(21) Appl. No.: 13/954,162

(22) Filed: Jul. 30, 2013

(65) Prior Publication Data

US 2014/0165387 A1    Jun. 19, 2014

(30) Foreign Application Priority Data

Dec. 17, 2012    (KR) .................. 10-2012-0147783

(51) Int. Cl.
| | |
|---|---|
| *B23P 19/10* | (2006.01) |
| *B62D 65/02* | (2006.01) |
| *B62D 65/06* | (2006.01) |
| *B23P 19/04* | (2006.01) |

(52) U.S. Cl.
CPC .............. *B23P 19/107* (2013.01); *B23P 19/04* (2013.01); *B23P 19/10* (2013.01); *B62D 65/024* (2013.01); *B62D 65/06* (2013.01); *B23P 2700/50* (2013.01); *E05Y 2900/50* (2013.01); *Y10T 29/53535* (2015.01); *Y10T 29/53974* (2015.01)

(58) Field of Classification Search
CPC ........ B23P 19/107; B23P 19/04; B23P 19/10; B23P 2700/50; B62D 65/06; B62D 65/024; E05Y 2900/50; Y10T 29/53535; Y10T 29/53974
See application file for complete search history.

(56) References Cited

U.S. PATENT DOCUMENTS

2014/0165386 A1*   6/2014   Jin .................................. 29/700
2014/0167342 A1*   6/2014   Jin .................................. 269/27

FOREIGN PATENT DOCUMENTS

KR    10-1993-0023276 A    12/1993

* cited by examiner

*Primary Examiner* — John C Hong
(74) *Attorney, Agent, or Firm* — Mintz Levin Cohn Ferris Glovsky and Popeo, P.C.; Peter F. Corless (57) ABSTRACT

A device for aligning door hinges of an automatic system that mounts door hinges to a vehicle automatically mounts a plurality of door hinges within a hinge box to upper and lower seats on pillars of a vehicle body conveyed by a conveying unit. The device includes at least one stand frame and a tilting plate that is coupled to the stand frame to tile the tilting plate in an upward and downward direction. In addition, the device includes a tilting cylinder that is vertically disposed with one side hinged to the stand frame and the other side hinged to the tilting plate.

15 Claims, 8 Drawing Sheets

DEVICE FOR ALIGNING DOOR HINGE OF AUTOMATIC SYSTEM FOR MOUNTING DOOR HINGE TO VEHICLE

CROSS-REFERENCE TO RELATED APPLICATION

This application claims priority to and the benefit of Korean Patent Application No. 10-2012-0147783 filed in the Korean Intellectual Property Office on Dec. 17, 2012, the entire contents of which are incorporated herein by reference.

BACKGROUND (a) Field of the Invention

The present invention relates to an automatic system for mounting door hinges to a vehicle. More particularly, the present invention relates to a device that aligns door hinges contained a within hinge box.

(b) Description of the Related Art

In general, the process of mounting a door to a vehicle body is implemented by mounting door hinges to the front and rear pillars of a side panel and then fastening a door to the door hinges. Specifically, the door hinges are mounted to the vehicle by bringing door hinges in close contact with upper and lower seats of the front and rear pillars with a door hinge mounting jig and then bolting the door hinges to the door hinge seats, after a vehicle body is moved into position for work by a conveyer system.

The door hinge mounting jig can move forward to the side panel of the vehicle body, with the door hinges loaded, insert a tooling pin into the vehicle body, clamp the vehicle body, and move a door into position on the upper and lower door hinge seats of the front and rear pillars. During this process, a worker manually bolts the door hinges to the door hinge seats with an electric fastening device.

In the process of mounting door hinges described above, the door hinges are manually aligned and then fastened, on the mounting jig, to the hinge seats of a vehicle body. The process may cause an increase manufacturing costs, because the process depends on manual labor throughout the aligning and mounting of the door hinges to a vehicle body.

Further, since the door hinges are manually fastened in the process of mounting door hinges, the worker may cause assembly variation through carelessness, which may deform a door or deteriorate the external appearance of the door. Thus, productivity may deteriorate due to the time required to maintain the product quality.

The above information disclosed in this Background section is only for enhancement of understanding of the background of the invention and therefore it may contain information that does not form the prior art that is already known in this country to a person of ordinary skill in the art.

SUMMARY

The present invention provides a device for aligning door hinges of an automatic system to mount door hinges to a vehicle having advantages of automatically aligning a plurality of door hinges contained within a hinge box.

An exemplary embodiment of the present invention provides a device for aligning door hinges of an automatic system to mount door hinges to a vehicle, which aligns a plurality of door hinges within a hinge box. Specifically, in the automatic system for mounting door hinges to a vehicle, the system may automatically mount door hinges to upper and lower seats on pillars of a vehicle body conveyed by a conveying unit, and may include: at least one stand frame; a tilting plate coupled to the stand frame to tile the tilting plate up and down; and a tilting cylinder vertically disposed with one side hinged to the stand frame and the other side hinged to the tilting plate.

The device for aligning door hinges of an automatic system may further include a vibration plate seated on the top of the tilting plate and supported by the edges of the tilting plate, and a vibrating mechanism disposed on the bottom of the tilting plate and configured to vibrate the vibration plate. In addition, a plurality of support plates that support the vibration plate may be disposed around the edges of the tilting plate.

Furthermore, the vibrating mechanism may include: a vibration cylinder fixed to the bottom of the tilting plate and having a rack on an actuating rod that reciprocates in the plane direction of the tilting plate; a rotary shaft disposed across the actuating rod and rotatably disposed on the bottom of the tilting plate; a pinion gear fixed to the rotary shaft and corresponding to the rack on the actuating rod; and at least one hitting member fitted coaxially on the rotary shaft and configured to apply vibration to the vibration plate via apertures formed through the tilting plate.

Additionally, the device may include a bearing fixed by the bottom of the tilting plate and disposed at both ends of the rotary shaft. The hitting member may be formed in plate shapes and may have hitting protrusions that protrude in several directions from the center of the rotary shaft. The ends of the hitting protrusions which hit the vibration plate may be rounded.

Furthermore, the device may further include a plurality of position sensors disposed on the tilting plate, movably in the alignment direction of door hinges within the hinge box, and sensing alignment positions of the door hinges. In addition, an actuating cylinder may be fixed to the tilting plate and the position sensors may be fixed to the actuating cylinder through a fixing bracket.

A hinge guide that supports the door hinges may be disposed on the bottom inside the hinge box. Further, a plurality of holding protrusions that hold the door hinges may be formed in parallel on the hinge guide and a plurality of seating grooves where the door hinges are seated may be formed between the holding protrusions. The hinge guide may be made of an MC nylon material.

Furthermore, a plurality of stopper blocks with a stopper groove may be disposed at the edge of the bottom of the tilting plate and stopper protrusions that are fitted into stopper grooves of the stopper block may be disposed on the stand frame. A pair of first hinge blocks forming center points for tilting may be disposed on the bottom of the tilting plate. Second hinge blocks hinged to the first hinge blocks by hinge pins may be disposed on the stand frame. In addition, the stopper protrusions that correspond to the center points for tilting of the tilting plate may be inclined to limit the tilting range of the tilting plate. The tilting plate may be tilted at about 30 degrees by the tilting cylinder.

Another exemplary embodiment of the present invention provides a device for aligning door hinges of an automatic system to mount door hinges to a vehicle, which aligns a plurality of door hinges contained within a hinge box. Specifically, the automatic system may automatically mount the door hinges to upper and lower seats on pillars of a vehicle body conveyed by a conveying unit, and may include: a hinge guide disposed on the bottom inside the hinge box and supporting the door hinges; a hinge guide disposed on a bottom inside the hinge box and may support the door hinges; and a tilting plate that supports the hinge box may be coupled to the stand frame to tilt the tilting plate up and down, in which the door hinges within the hinge box are aligned by gravity via the hinge guide, by tilting the tilting plate, and the door hinges within the hinge box may be automatically aligned by vibration applied to the stand frame.

According to exemplary embodiments of the present invention, unlike the related art of manually aligning door hinges, it may be possible to automatically align door hinges within a hinge box, using vibration and gravity, by applying vibration to the hinge box with a vibrating mechanism. Therefore, according to exemplary embodiments of the present invention, it may be possible to improve productivity in mounting door hinges to a vehicle and to reduce the manufacturing cost.

Further, since it may be possible to further improve the product quality in assembly by reducing assembly variation of the door hinges through automatic alignment of the door hinges, it may be possible to prevent deformation and deterioration of the external appearance of a door caused by assembly variation and to reduce the time required for maintaining the quality and repairing the product in the subsequent processes.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The unrelated parts to the description of the exemplary embodiments are not shown to make the description clear and like reference numerals designate like element throughout the specification. Further, the configurations shown in the drawings are provided selectively for the convenience of description, so that the present invention is not limited to those shown in the drawings and the thicknesses are exaggerated to make some parts and regions clear. Discriminating the names of components with the first, the second, etc. in the following description is for discriminating them for the same relationship of the components and the components are not limited to the order in the following description.

Throughout the specification, unless explicitly described to the contrary, the word "comprise" and variations such as "comprises" or "comprising", will be understood to imply the inclusion of stated elements but not the exclusion of any other elements. Further, the terms, " . . . unit", " . . . means", " . . . portion", " . . . member" etc. used herein mean the unit of inclusive components performing at least one or more functions or operations.

Figure 1:
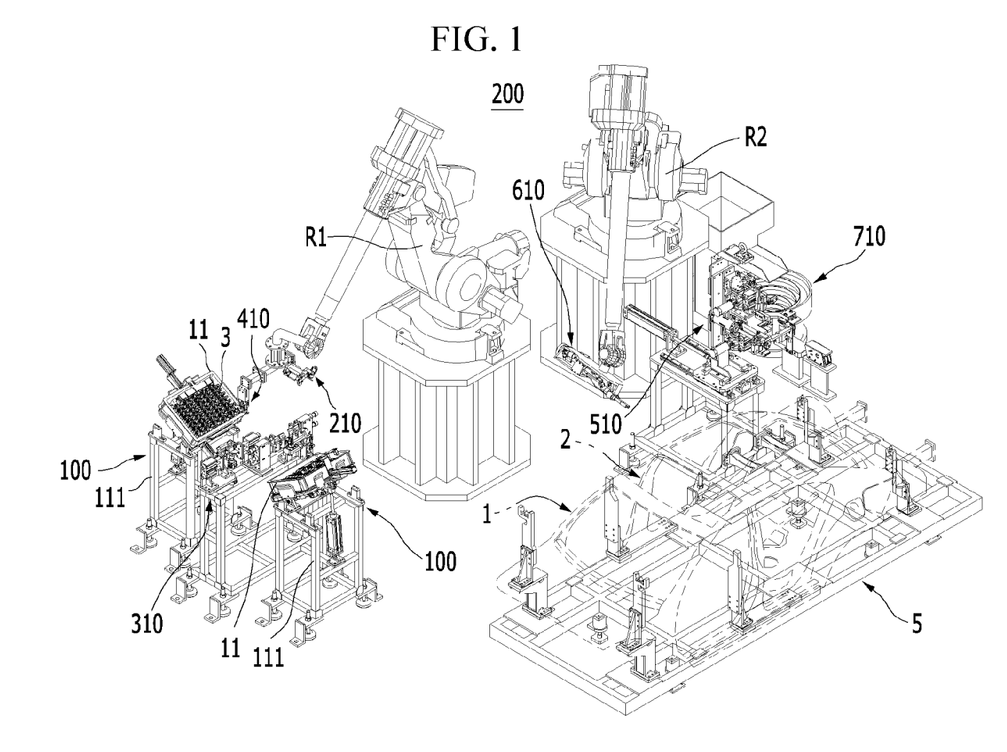
FIG. 1 is an exemplary view showing an automatic system for mounting door hinges to a vehicle according to an exemplary embodiment of the present invention.

FIG. 1 is an exemplary view showing an automatic system for mounting door hinges to a vehicle according to an exemplary embodiment of the present invention. Referring to FIG. 1, an exemplary embodiment of the present invention may be used in a door mounting line for mounting a front door and a rear door to both side panels 2 of a vehicle body 1 in a vehicle body assembly factory.

A device 100 that aligns door hinges according to an exemplary embodiment of the present invention may be used for an automatic system 200 that automatically mounts door hinges 3 to the side panes 2 of a vehicle body 1 conveyed by a conveying unit 5. For example, the automatic system 200 for mounting door hinges to a vehicle may be used to mount the door hinges 3, as in FIG. 2, in advance, to the upper and lower portions of front pillars and rear pillars of the side panels 2 of the vehicle body 1.

The conveying unit 5, which conveys the vehicle body 1, may include various jigs that may fix and support the vehicle body 1. The door hinges 3 may fit into an upper hinge shown in FIG. 2A and a lower hinge shown in FIG. 2B. The upper hinges may be mounted on the upper portions of the front and rear pillars of the side panel 2 and on the upper portion of a door. The lower hinges may be mounted on the lower portions of the front and rear pillars of the side panel 2 and on the lower portion of a door.

Figure 2A:
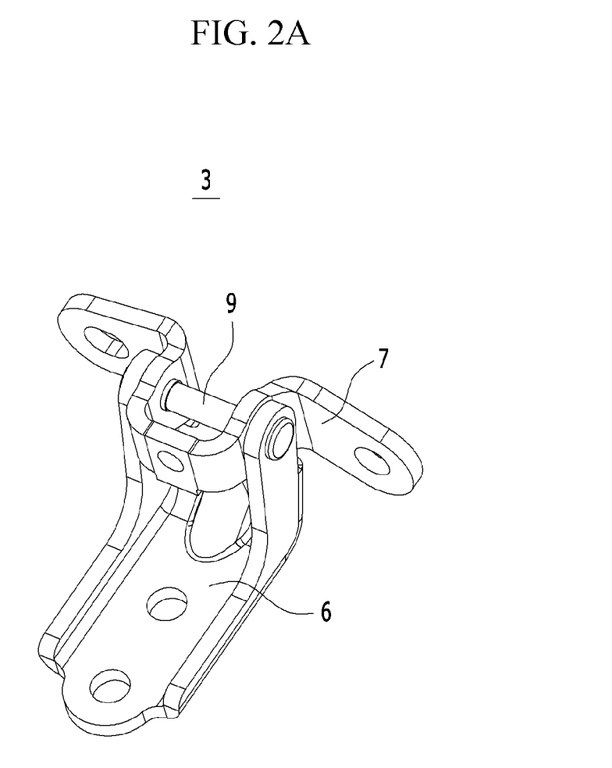
FIGS. 2A-2B are an exemplary views showing door hinges used in a device for aligning door hinges of an automatic system that mounts door hinges to a vehicle according to an exemplary embodiment of the present invention.
Figure 2B:
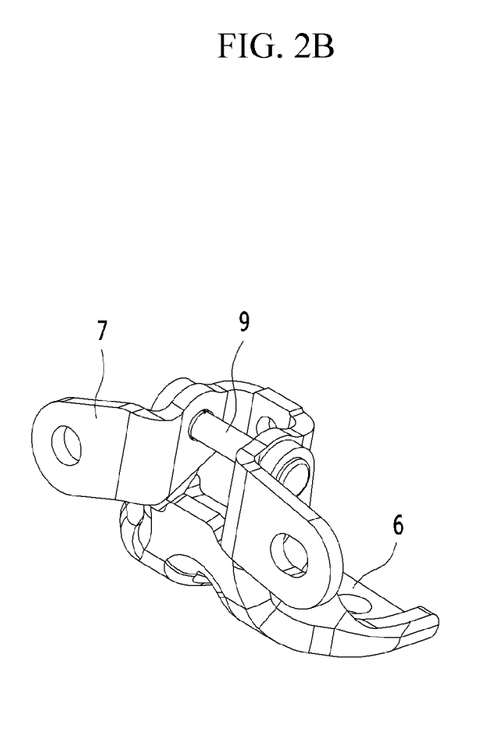

The door hinge 3 may include a hinge bracket 6 to be mounted on the side panel 2, a door bracket 7 to be mounted on a door (not shown), and a hinge pin 9 that hinges the hinge bracket 6 and the door bracket 7. Door hinge seats (not shown) where the door hinges 3 are mounted may be formed at the upper and lower portions of the front pillar and the rear pillar of the side panel 2. A plurality of bores (not shown) that bolt the door hinges 3 may be formed at each of the door hinge seats. In addition, aligning apertures (not shown) that determines the reference position of the system 200 and the reference positions of the door hinges 3 may be formed at the side panels 2 of the vehicle body 1.

The automatic system 200 for mounting door hinges to a vehicle may include a first gripper 210, an aligning jig 310, a second gripper 410, a mounting jig 510, a bolt runner 610, and a bolt feeder 710.

The device 100 for aligning door hinges according to an exemplary embodiment of the present invention may have a structure capable of automatically aligning the door hinges 3 contained within a hinge box 11. The configuration of the device 100 for aligning door hinges will be described in more detail below.

The first gripper 210 may be configured to grip and remove the door hinges 3, which are aligned within the hinge box 11 by the device 100 for aligning door hinges, and may load the hinges onto the aligning jig 310 one by one. The aligning jig 310 may be configured to support and fix the door hinges 3 removed from the hinge box 11 by the first gripper 210 and arrange the door hinges 3 in position at a predetermined mounting angle.

The second gripper 410 may be configured to grip and unload (e.g., remove) the door hinges 3 aligned by the aligning jig 310 and load the door hinges 3 to the mounting jig 510. The mounting jig 510 may be configured to clamp the door hinges 3 loaded by the second gripper 410 and set the door hinges 3 into the door hinge seats of the vehicle body 1 while clamping the vehicle body 1. The bolt runner 610 may be configured to bolt the door hinges 3 set in the door hinge seats of the vehicle body 1 by the mounting jig 510 and the bolt feeder 710 may be configured to feed bolts to the bolt runner 610.

The first and second grippers 210 and 410 used in the automatic system 200 for mounting door hinges to a vehicle may be moved to a position where the door hinges 3 are aligned by a first handling robot R1 and the bolt runner 610 may be moved to the position where the door hinges 3 are bolted by the second handling robot R1.

The configuration of the device 100 for aligning door hinges according to an exemplary embodiment of the present invention which is used in the automatic system 200 for mounting door hinges to a vehicle is described in detail hereafter. The device 100 for aligning door hinges according to an exemplary embodiment of the present invention may have a structure capable of automatically aligning the door hinges 3 contained within a hinge box 11 as described above, using vibration and the gravity.

Figure 3:
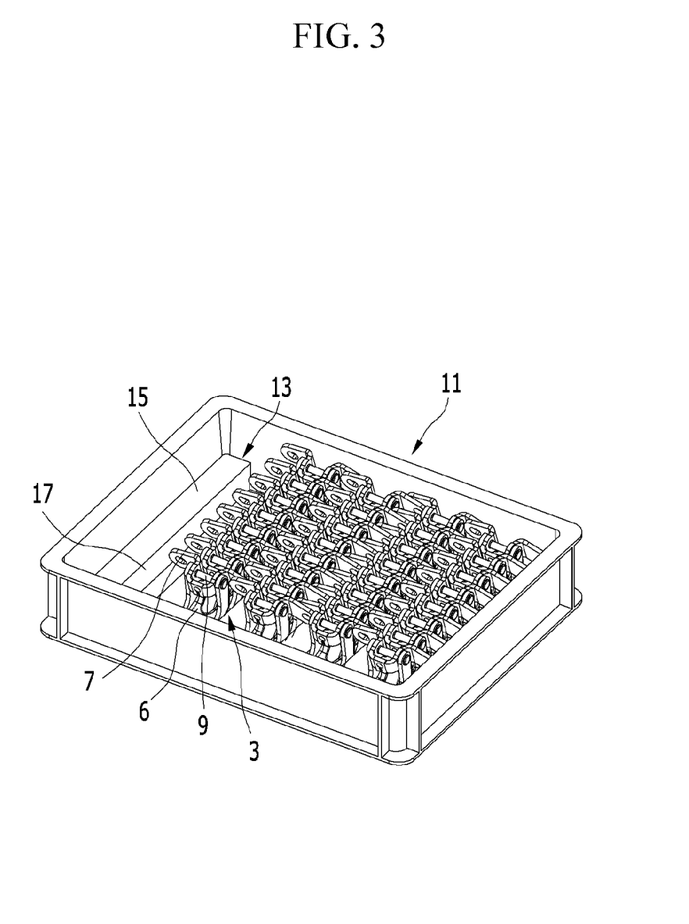
FIG. 3 is an exemplary view showing a hinge box used in a device for aligning door hinges of an automatic system that mounts door hinges to a vehicle according to an exemplary embodiment of the present invention.
Figure 4:
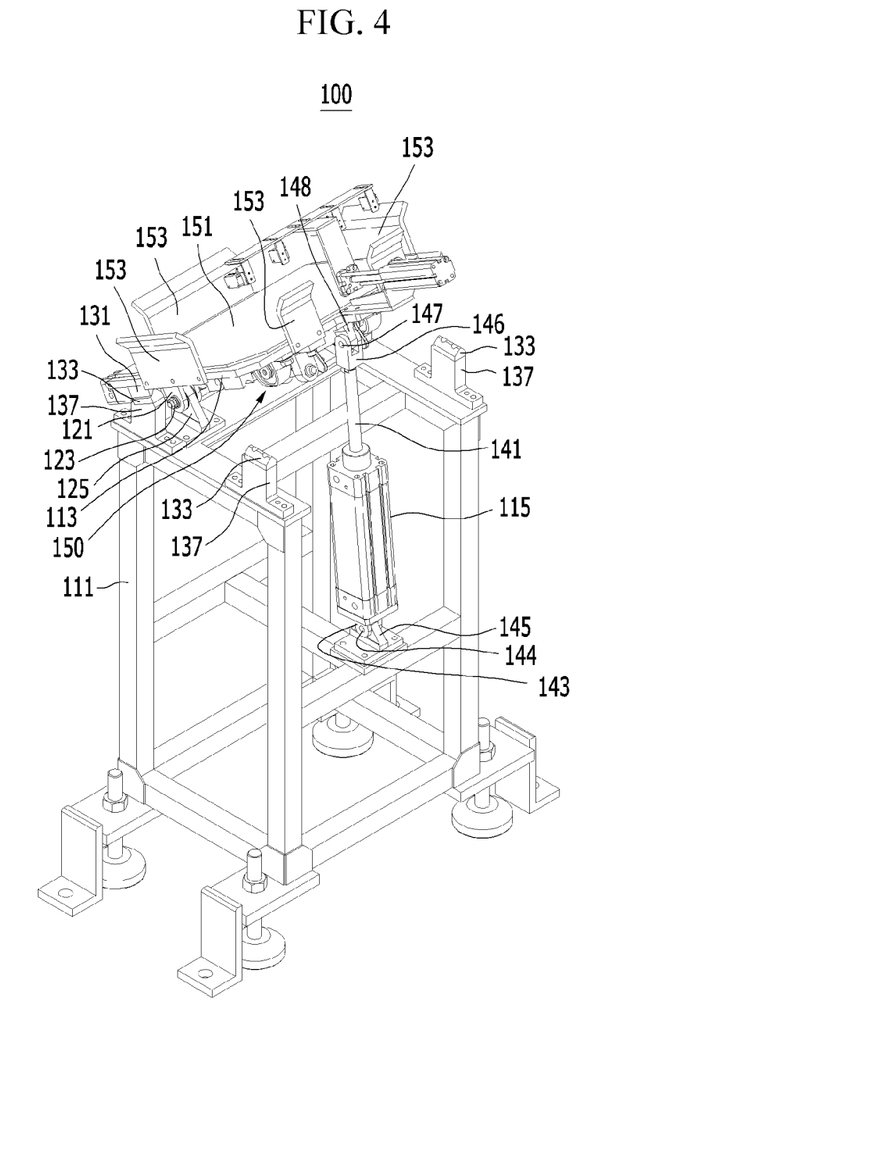
FIGS. 4 to 7 are exemplary views showing a device for aligning door hinges of an automatic system that mounts door hinges to a vehicle according to an exemplary embodiment of the present invention.

For example, the hinge box 11 may be, as shown in FIG. 3, formed in the shape of a box with an open top and a closed bottom and may include a plurality of door hinges 3 in a plurality of lines. Although typical upper hinges are shown in the drawings as the door hinges 3 to be contained in the hinge box 11, the hinge box 11 according to an exemplary embodiment of the present invention may contain lower hinges as the door hinges 3. The hinge box 11 may have the same in basic configuration containing lower hinges and upper hinges as the door hinges 3, such that an example containing upper hinges as the door hinges 3 in the hinge box 11 is described hereafter.

A hinge guide 13 that supports the door hinges 3 may be disposed on a bottom, inside the hinge box 11. The hinge guide 13 may be configured to seat and hold the door hinges 3 and may be made of plastic such as an MC nylon material to be advantageous in terms of weight and cost. A plurality of holding protrusions 15 that hold the door brackets 7 of the door hinges 3 may be formed in parallel at the hinge guide 13 and seating grooves 17 where the hinge brackets 6 of the door hinges 3 are seated may be formed between the holding protrusions 15. Therefore, the door hinges 3 contained within the hinge box 11 may be aligned in a plurality of lines on the hinge guide 13.

FIGS. 4 to 7 are exemplary views showing a device for aligning door hinges of an automatic system for mounting door hinges to a vehicle according to an exemplary embodiment of the present invention. Referring to FIGS. 4 to 7, the device 100 for aligning door hinges of an automatic system for mounting door hinges to a vehicle may include a stand frame 111, a tilting plate 113, and a tilting cylinder 115.

A pair of stand frames 111 may be disposed, facing each other outside the conveying unit 5, as in FIG. 1. The stand frame 111 may include accessories such as various brackets, support blocks, plates, housing, covers, and collars that support various components that are described below. However, since the accessories are utilized to install the components on the stand frame 111, they are referred to as the stand frame 111, except for specific cases, in the exemplary embodiment.

The stand frame 111 supports the hinge box 11 (hereafter, see FIG. 3) containing the door hinges 3 (hereafter, see FIG. 2) and also supports the following components that may tilt the hinge box 11 up and down and apply vibration to the hinge box 11. The stand frames 111 may be provided in a pair facing each other to set a hinge box 11 that contains upper hinges as the door hinges 3 on one stand frame 111 and set a hinge box 11 that contains lower hinges as the door hinges 3 on the other stand frame 111.

The tilting plate 113, that supports the hinge box 11, may be coupled to the stand frame 111 such that it may tilt up and down. The tilting plate 113 may be a substantially rectangular plate and may tilt up and down with one edge as a pivot. In particular, a pair of hinge blocks 121 that form the center points for tilting of the tilting plate 113 to the stand frame 111 may be disposed on one edge of the bottom of the tilting plate 113. The first hinge blocks 121 may be implemented by fork-shaped bracket. Further, a pair of second hinge blocks 125 hinged to the first hinge blocks 121 via hinge pins 123 may be disposed on the top of the stand frame 111, corresponding to the first hinge blocks 121.

Stopping mechanisms that limit the tilting range of the tilting plate 113 and maintain a horizontal position of the tilting plate 113 may be disposed between the edge of the bottom of the tilting plate 113 and the corresponding edge of the top of the stand frame 111. The stopping mechanism may include a stopper block 131 disposed at the edge of the bottom of the tilting plate 113 and a stopper protrusion 133 that is disposed at the edge of the top of the stand frame 111 and corresponds to the stopper block 131.

The stopper block 131 may have a stopper groove 131 that is open in a downward direction and the stopper protrusion 133 may be shaped to be fitted in the stopper groove 135 of the stopper block 131. The stopper protrusion 133 may be mounted on a seating block 137 at the edge on the top of the stand frame 111. In particular, the stopper protrusions 133 at the edge that correspond to the center points for tilting of the tilting plate 113 may be arranged at an angle in the tilting direction of the tilting plate 113 to limit the tilting range of the tilting plate 113.

The tilting cylinder 115, which provides a driving force for tilting the tilting plate 113 up and down, may be a pneumatic cylinder operated by air pressure. The tilting cylinder 115 may be vertically arranged on the stand frame 111. A first side of the tilting cylinder 115 may be hinged to the stand frame 111 and a second side of the tilting cylinder 115, which may be an actuating rod 141, may be hinged to the bottom of the tilting plate 113. In other words, the body of the tilting cylinder 115 may be hinged to a first connecting member 145 of the stand frame via a first hinge member 143 and a first hinge pin 144. The upper end of the actuating rod 141 may be hinged to a second connecting member 148 on the bottom of the tilting plate 113 via a second hinge member 146 and a second hinge pin 147.

The tilting plate 113 with the configuration described above may be tilted vertically at about 30 degrees via the tilting cylinder 115 and the stopping mechanisms described above.

The device 100 for aligning door hinges according to an exemplary embodiment of the present invention may further include a vibrating mechanism 150 that applies vibration to the hinge box 11 on the tilting plat 113. In addition to the vibrating mechanism 150, a vibration plate 151 on which the hinge box 11 may be placed and which may be vibrated by vibration force from the vibrating mechanism 150 may be disposed on the top of the tilting plate 113. The vibration plate 151 may be seated on the top of the tilting plate 113 while being supported by the edges of the tilting plate 113. Additionally, support plates 153 that support the vibration plate 151 may be disposed around the edges of the tilting plate 113.

Figure 5:
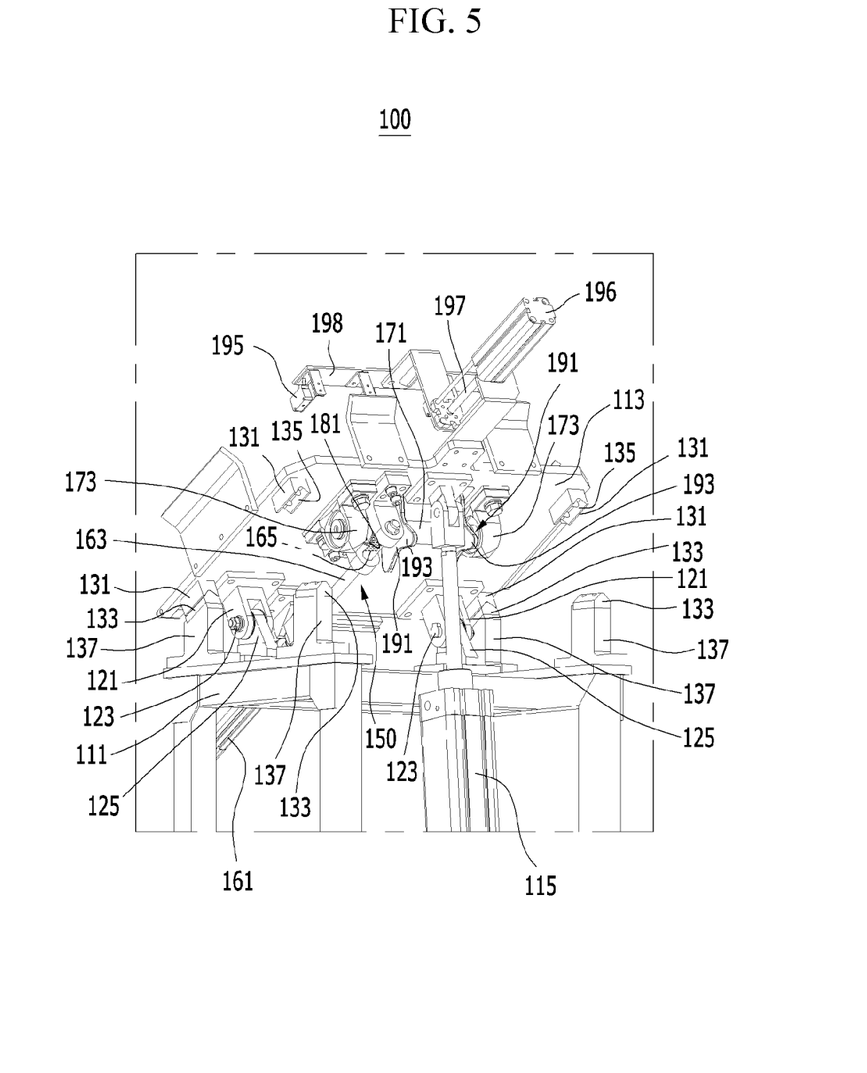
Figure 6:
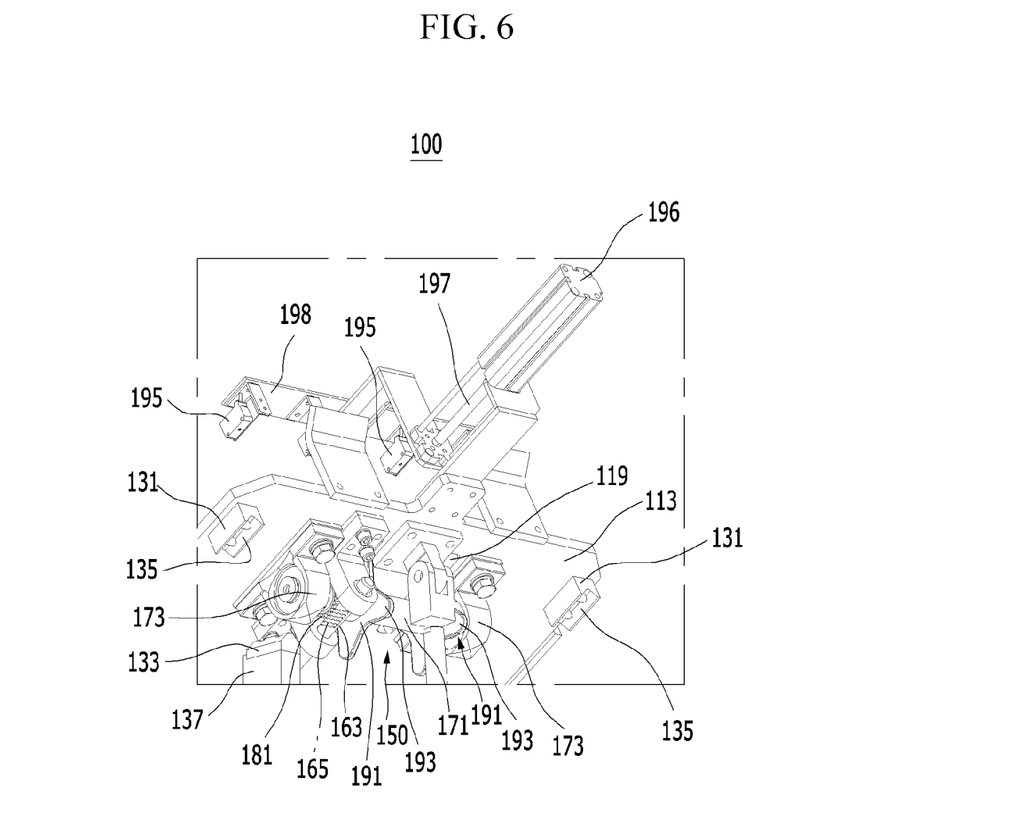
Figure 7:
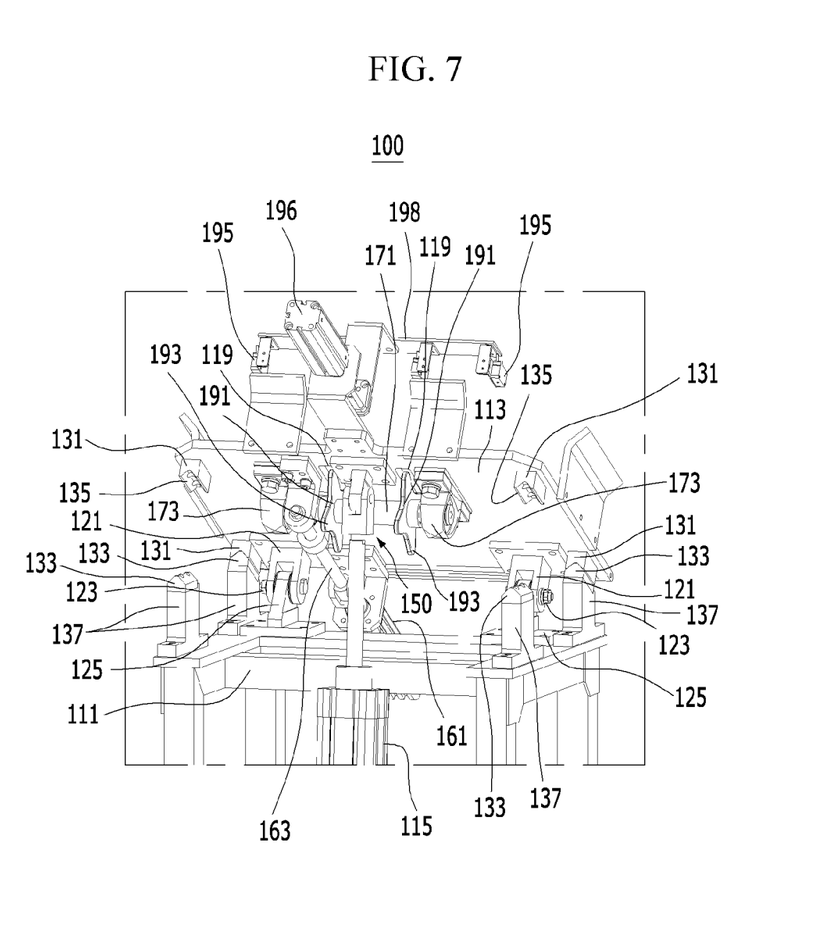

In an exemplary embodiment of the present invention, the vibrating mechanism 150, which vibrates the vibration plate 151, as in FIGS. 5 to 7, may be disposed on the bottom of the tilting plate 113. The vibrating mechanism 150 may include a vibration cylinder 161, a rotary shaft 171, a pinion gear 181, and hitting members 191.

The vibration cylinder 161, a vibration source that generates vibration force, may be fixed on the bottom of the tilting plate 113 and may include an actuating rod 163 that reciprocates in the plane direction of the tilting plate 113 (e.g., across the tilting plate). The actuating rod 163 may include a rack 165 formed in a predetermined longitudinal section.

The rotary shaft 171 may be disposed across the actuating rod 163 of the vibration cylinder 161, to be rotatable on the bottom of the tilting plate 113. A bearing 173 fixed to the bottom of the tilting plate 113 may be disposed at both ends of the rotary shaft 171. In addition, the pinion gear 181 may be fitted on the rotary shaft 171 and may rotate with the rotary shaft 171. The pinion gear 181 may correspond to the rack 165 of the actuating rod 163.

The hitting members 191, which apply vibration to the vibration plate 151 while rotating with the rotary shaft 171, may be fitted coaxially on the rotary shaft 171. The hitting members 191 may be provided in a pair and formed in plate shapes. Hitting protrusions 193 that protrude in several directions from the center of the rotary shaft 171 may be formed at the hitting members 191. For example, the hitting members 191 may be formed in the shape of a star or a starfish. The ends of the hitting protrusions 193 of the hitting members 191 which hit the vibration plate 151 may be rounded to hit the vibration plate 151 more easily.

In this configuration, the hitting members 191 may hit the vibration plate 151 from under and through the tilting plate 113. For such an operation, a pair of apertures 119 may be formed through the tilting plate 113 to allow the hitting protrusions 193 of the hitting member 191 to protrude through them.

On the other hand, the device 100 for aligning door hinges according to an exemplary embodiment of the present invention may include a plurality of position sensors 195 that sense the alignment positions of the door hinges 3 within the hinge box 11 and output sensing signals to a controller (not shown). For example, the position sensors 195 may be photo-sensors that detect the accurate positions of the door hinges 3 of the related art.

The position sensors 195 may be moved in the alignment direction of door hinges within the hinge box 11 by an actuating cylinder 196 fixed to the tilting plate 113. In other words, the position sensors 195 may be attached to a fixing bracket 198 fixed at the end of an actuating road 197 of the actuating cylinder 196. The position sensors 195 may be moved in the alignment direction of the door hinges within the hinge box 11 by the actuating cylinder 196 and may measure the distances from the door hinges 3 aligned within the hinge box 11. The controller may be configured to supply a control signal to a part that removes the door hinges 3, when determining that the door hinges 3 are positioned at distances within a tolerance range based on the values measured by the position sensors 195.

The operation of the device 100 for aligning door hinges of an automatic system for mounting door hinges to a vehicle according to an exemplary embodiment of the present invention which has the configuration described above is described hereafter in detail with reference to the drawings stated above. The operation of the device 100 for aligning door hinges is described hereafter in association with main components of the automatic system 200 for mounting door hinges to a vehicle where an exemplary embodiment of the present invention is applied. The exemplary embodiment of the present invention assumes that the following operations are performed within the vehicle body 1, which has been conveyed by the conveying unit 5 and has been stopped at a predetermined work position.

First, the hinge box 11 with the door hinges 3 arranged in a plurality of lines therein may be loaded onto the tilting plate 114 of the device 100. A plurality of hinge boxes 11 may be stacked at a specific location and placed onto the tilting plates 113 on the stand frames 111 by a conveying unit not shown in the drawing but known in the art.

The tilting plates 113 may be maintained in a horizontal orientation by the operation of the tilting cylinder 115 and the hinge boxes 11 may each be seated on the vibration plate 151 on the tilting plate 113. The stopper protrusions 133 on the top of the stand frame 111 may be disposed in the stopper grooves 135 of the stopper blocks 131 on the bottom of the tilting plate 113. Accordingly, the tilting plate 113 may maintain a horizontal orientation with respect to the top of the stand frame 111. In orientation, the actuating rod 141 may be extended by operating the tilting cylinder 115.

Accordingly, the tilting plate 113 may be tilted up at a predetermined mounting angle (e.g., about 30 degrees) with the hinge pins 123 of the hinged first and second hinge blocks 121 and 125, as center points for tilting. Since the stopper protrusions 133 at the edge that correspond to the center points for tilting of the tilting plate 113 are inclined in the tilting direction of the tilting plate 113, the stopper protrusions 133 may limit the tilting range of the tilting plate 113 by being fitted into the stopper grooves 135 of the stopper blocks 131.

When the tilting plate 113 is finished tilting, as described above, the vibration cylinder 161 of the vibrating mechanism 150 may reciprocate the actuating rod 163. Accordingly, the rotary shaft 171 may be rotated in both directions by the reciprocation of the actuating rod 163, since the rotary shaft 171 is rotatably disposed on the bottom of the tilting plate 113, the pinion gear 181 may be fitted on the rotary shaft 171, and the pinion gear 181 may correspond to the rack 165 of the actuating rod 163.

Accordingly, the hitting members 191 on the rotary shaft 171 may rotate. The hitting members 191 may rotate, with the hitting protrusions 193 that protrude through the apertures 119 of the tilting plate 113. Therefore, in an exemplary embodiment of the present invention, as the hitting members 191 are rotated by the operation of the actuating cylinder 161, as described above, the hitting protrusions 193 of the hitting member 191 may hit the vibration plate 151 through the apertures 191, to vibrate the vibration plate 151 that has the hinge box 11 mounted thereon. Therefore, since the vibration plate 151 may be vibrated by the hitting members 191 of the vibrating mechanism 150, with the tilting plate 113 tilted, the door hinges 3 within the hinge box 11 may be aligned in lines along the hinge guides 13 by the vibration and the gravity.

In this process, the position sensors 195 of the device 100 may be configured to measure the distances from the door hinges 3 aligned within the hinge box 11 and output the measured values to the controller (not shown), after being moved in the alignment direction of the door hinges 3 via the actuating cylinder 196. Then, the controller may be configured to supply operation signals to the first handling robot R1 and the first gripper 210 described above, when determining that the door hinges 3 are positioned at distances within a tolerance range based on the measured values from the position sensors 195.

On the other hand, the automatic system 200 for mounting door hinges to a vehicle that uses an exemplary embodiment of the present invention may grip the door hinges 3 aligned within the hinge box 11 by the device 100 for aligning door hinges with the first gripper 210 and may remove the door hinges 3 from the hinge box 11 by operating the first handling robot R1. The first gripper 210 may set the door hinges 3 on the aligning jig 310 via the first handling robot R1. Further, the aligning jig 310 may align the door hinges 3 into position at a predetermined mounting angle while fixedly supporting the door hinges 3.

Thereafter, the second gripper 410 may grip and unload (remove) the door hinges 3 aligned by the aligning jig 310 and then load the door hinges 3 to the mounting jig 510. Then, the mounting jig 510 may clamp the door hinges 3 loaded by the second gripper 410 and set the door hinges 3 into the door hinge seats of the vehicle body 1 while clamping the vehicle body 1.

After the door hinges 3 are set with respect to the vehicle body 1, the door hinges 3 may be bolted to the vehicle body 1 via the bolt runner 610 operated by the second handling robot R2.

According to the device 100 for aligning door hinges of an automatic system for mounting door hinges to a vehicle according to an exemplary embodiment of the present invention as described above, unlike the related art that manually aligns door hinges, it may be possible to automatically align the door hinges 3 within the hinge box 11, using vibration and the gravity, by tilting the tilting plate 113 with the tilting cylinder 115 and applying vibration to the hinge box 11 with the vibrating mechanism 150.

Therefore, since the device 100 of an automatic system that mounts door hinges to a vehicle may automatically align the door hinges 3 before mounting them to the vehicle body 1, it may be possible to improve productivity in mounting the door hinges 3 to the vehicle body and to reduce the manufacturing cost.

Further, since it may be possible to further improve the product quality in assembly by reducing assembly variation of the door hinges through automatic alignment of the door hinges 3, it may be possible to prevent deformation and deterioration of the external appearance of a door due to assembly variation and to reduce the time taken for maintaining the quality and repair of the product in subsequent processes.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of symbols | |
| --- | --- |
| 1: Vehicle body | 2: Side panel |
| 3: Door hinge | 5: Conveying unit |
| 6: Hinge bracket | 7: Door bracket |
| 11: Hinge box | 13: Hinge guide |
| 100: Device for aligning door hinge | 111: Stand frame |
| 113: Tilting plate | 115: Tilting cylinder |
| 150: Vibrating mechanism | 151: Vibration plate |
| 161: Vibration cylinder | 165: Rack |
| 171: Rotary shaft | 181: Pinion gear |
| 191: Hitting member | 195: Position sensor |

What is claimed is:

1. A device that aligns a plurality of door hinges contained within a hinge box, in an automatic system for mounting door hinges to upper and lower seats on pillars of a vehicle body, the device comprising:
   at least one stand frame;
   a tilting plate coupled to the stand frame to tilt the tilting plate is tilted in an upward and downward direction;
   a tilting cylinder vertically disposed with a first side hinged to the stand frame and a second side hinged to the tilting plate
   a vibration plate seated on the top of the tilting plate and supported by edges of the tilting plate; and
   a vibrating mechanism disposed on a bottom of the tilting plate and configured to vibrate the vibration plate,
   wherein the vibrating mechanism includes:
      a vibration cylinder fixed to the bottom of the tilting plate and having a rack on an actuating rod that reciprocates in a plane direction of the tilting plate;
      a rotary shaft disposed across the actuating rod and rotatably disposed on the bottom of the tilting plate;
      a pinion gear fixed to the rotary shaft corresponds the rack on the actuating rod; and
   at least one hitting member fitted coaxially on the rotary shaft and configured to apply vibration to the vibration plate through apertures formed through the tilting plate.

2. The device of claim 1, wherein a plurality of support plates supporting the vibration plate are disposed around the edges of the tilting plate.

3. The device of claim 1, wherein a bearing fixed by the bottom of the tilting plate is disposed at both ends of the rotary shaft.

4. The device of claim 1, wherein the hitting member is formed in a plate shape and includes hitting protrusions that protrude in several directions from a center of the rotary shaft.

5. The device of claim 4, wherein the ends of the hitting protrusions which hit the vibration plate are rounded.

6. The device of claim 1, further comprising:
   a plurality of position sensors disposed on the tilting plate, movably in an alignment direction of the door hinges in the hinge box, and configured to sense alignment positions of the door hinges.

7. The device of claim 6, wherein an actuating cylinder is fixed to the tilting plate and the position sensors are fixed to the actuating cylinder via a fixing bracket.

8. The device of claim 1, wherein a hinge guide that supports the door hinges is disposed on a bottom inside of the hinge box.

9. The device of claim 8, wherein
   a plurality of holding protrusions that hold the door hinges are formed in parallel on the hinge guide, and a plurality of seating grooves where the door hinges are seated are formed between the holding protrusions.

10. The device of claim 8, wherein the hinge guide is made of a MC nylon material.

11. The device of claim 1, wherein
a plurality of stopper blocks having a stopper groove are disposed at the edge of the bottom of the tilting plate, and
a plurality of stopper protrusions that are fitted into the stopper grooves of the stopper block are disposed on the stand frame.

12. The device of claim 11, wherein
a pair of first hinge blocks that form center points for tilting the tilting plate are disposed on the bottom of the tilting plate, and
a pair of second hinge blocks hinged to the first hinge blocks via hinge pins are disposed on the stand frame.

13. The device of claim 12, wherein the stopper protrusions corresponding to the center points for tilting the tilting plate are inclined to limit the tilting range of the tilting plate.

14. The device of claim 1, wherein the tilting plate is tilted at about 30 degrees by the tilting cylinder.

15. A device for aligning a plurality of door hinges contained within a hinge box, in an automatic system that automatically mounts door hinges to upper and lower seats on pillars of a vehicle body conveyed by a conveying unit, the device comprising:
a hinge guide disposed on a bottom inside of the hinge box and configured to support the door hinges;
at least one stand frame; and
a tilting plate that supports the hinge box is coupled to the stand frame to tilt the tilting plate in an upward and downward direction,
wherein the door hinges within the hinge box are aligned by gravity through the hinge guide, by tilting the tilting plate, and
wherein the door hinges within the hinge box are automatically aligned by vibration applied to the stand frame.

* * * * *